United States Patent
Cho et al.

(10) Patent No.: US 9,634,525 B2
(45) Date of Patent: Apr. 25, 2017

(54) NON-CONTACT TYPE POWER RECEIVING APPARATUS

(71) Applicant: SAMSUNG ELECTRO-MECHANICS CO., LTD., Suwon-Si, Gyeonggi-Do (KR)

(72) Inventors: Sang Ho Cho, Suwon-Si (KR); Hyung Wook Cho, Suwon-Si (KR); Sung Heum Park, Suwon-Si (KR); Chang Mok Han, Suwon-Si (KR); Jae Suk Sung, Suwon-Si (KR); Jeong Man Han, Suwon-Si (KR); Ki Won Chang, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 135 days.

(21) Appl. No.: 14/619,048

(22) Filed: Feb. 10, 2015

(65) Prior Publication Data

US 2016/0056660 A1 Feb. 25, 2016

(30) Foreign Application Priority Data

Aug. 20, 2014 (KR) .......................... 10-2014-0108568

(51) Int. Cl.
- *H02J 7/00* (2006.01)
- *H01F 27/42* (2006.01)
- *H02J 50/40* (2016.01)
- *H02J 50/12* (2016.01)

(52) U.S. Cl.
CPC .............. *H02J 50/40* (2016.02); *H02J 50/12* (2016.02)

(58) Field of Classification Search
CPC .......... H02J 7/025; H02J 5/005; H04B 5/0037
USPC ........................................ 320/108; 307/104
See application file for complete search history.

(56) References Cited

U.S. PATENT DOCUMENTS

| | | | |
|---|---|---|---|
| 2010/0181961 A1* | 7/2010 | Novak | H02J 7/025 320/108 |
| 2013/0127405 A1 | 5/2013 | Scherer et al. | |
| 2013/0241303 A1 | 9/2013 | Bae | |
| 2013/0300204 A1* | 11/2013 | Partovi | H01F 38/14 307/104 |
| 2014/0191713 A1* | 7/2014 | Hong | H02J 7/0029 320/108 |
| 2016/0043590 A1* | 2/2016 | Ha | H02J 7/045 320/108 |
| 2016/0056664 A1* | 2/2016 | Partovi | H02J 7/025 307/104 |

FOREIGN PATENT DOCUMENTS

| KR | 10-2013-0054897 A | 5/2013 |
|---|---|---|
| KR | 10-2013-0102218 A | 9/2013 |
| KR | 10-2013-0130192 A | 12/2013 |

* cited by examiner

*Primary Examiner* — M'Baye Diao
(74) *Attorney, Agent, or Firm* — NSIP Law

(57) ABSTRACT

In a non-contact type power receiving apparatus, two power receiving coils may share a single rectifying circuit. A non-contact type power receiving apparatus may include a first power receiving coil and a second power receiving coil, and a selective rectifying unit rectifying power from one of the first and second power receiving coils which receives the power from an external power transmitting coil in a non-contact scheme.

11 Claims, 7 Drawing Sheets

NON-CONTACT TYPE POWER RECEIVING APPARATUS

CROSS-REFERENCE TO RELATED APPLICATION

This application claims priority to and the benefit of Korean Patent Application No. 10-2014-0108568 filed on Aug. 20, 2014, with the Korean Intellectual Property Office, the disclosure of which is incorporated herein by reference.

BACKGROUND

The present disclosure relates to a non-contact type power receiving apparatus capable of charging a battery with power provided in a non-contact scheme.

An electronic apparatus is operated using electricity as an energy source.

Electrical power needs to be supplied to an electronic apparatus as an energy source in order for the electronic apparatus to be operated. The electronic apparatus may self-generate the power, or may receive the power from an external power supply equipment.

In order for the electronic apparatus to receive power from the external power supply equipment, a power supplying apparatus for transferring power from the external power supplying equipment to the electronic apparatus is required.

As such a power supplying apparatus, a contact type power supplying apparatus directly connected to the electronic apparatus by a connector, or the like, to supply power to a battery embedded in the electronic apparatus is commonly used. Alternatively, power may be supplied to the battery embedded in the electronic apparatus in a non-contact scheme.

In particular, wearable devices, such as smart watches, smart glasses, and the like, are provided to be portable and thus, the battery therein can be charged in a non-contact scheme.

Since the wearable devices described above have various forms, unlike that of a portable terminal, it is appropriate to transmit power in various directions in the case where such wearable devices are positioned on a charging pad. However, as in the following Related Art Document, a general non-contact type power receiving apparatus may employ a single power receiving coil in the case where power is supplied to a battery in a non-contact scheme, and also requires both a rectifying circuit and a regulating circuit for each single power receiving coil, even in the case of using a plurality of power receiving coils. Accordingly, costs required for manufacturing such a non-contact type power receiving apparatus and a volume thereof may be increased.

RELATED ART DOCUMENT (Patent Document 1) Korean Patent Laid-Open Publication No. 2013-0054897

SUMMARY

An aspect of the present disclosure may provide a non-contact type power receiving apparatus in which two power receiving coils share a single rectifying circuit.

According to an aspect of the present disclosure, a non-contact type power receiving apparatus may include a first power receiving coil and a second power receiving coil, and a selective rectifying unit rectifying power from one of the first and second power receiving coils which receives the power from an external power transmitting coil in a non-contact scheme.

According to another aspect of the present disclosure, a non-contact type power receiving apparatus may include a plurality of power receiving units receiving power in a non-contact scheme, and a plurality of battery cells receiving the power from each of the plurality of power receiving units and being charged with the power. Each of the plurality of power receiving units may include a first power receiving coil and a second power receiving coil, a selective rectifying unit rectifying power from one of the first and second power receiving coils power receiving coil which receives the power from an external power transmitting coil in the non-contact scheme, a converting unit converting the rectified power into charging power and transmitting the charging power to a corresponding battery cell. The plurality of battery cells may be electrically connected to one another in at least one scheme of a serial connection scheme and a parallel connection scheme.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Exemplary embodiments in the present disclosure will now be described in detail with reference to the accompanying drawings.

Figure 1:
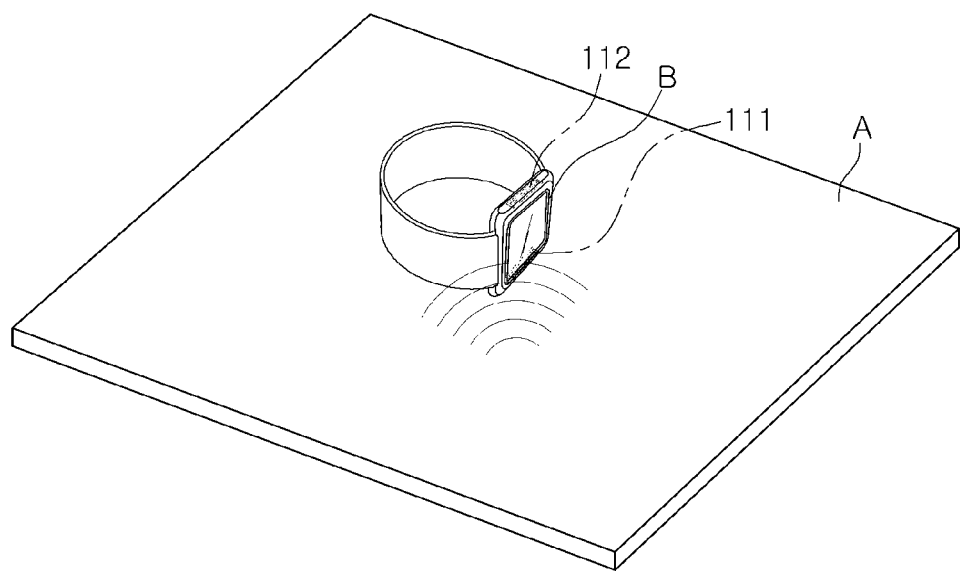
FIG. 1 is a diagram schematically illustrating a state in which a non-contact type power receiving apparatus receives power from a power charging pad according to an exemplary embodiment of the present disclosure.

FIG. 1 is a diagram schematically illustrating a state in which a non-contact type power receiving apparatus receives power from a power charging pad according to an exemplary embodiment of the present disclosure.

Referring to FIG. 1, a non-contact type power receiving apparatus B according to an exemplary embodiment of the present disclosure may receive power from a power charging pad A in a non-contact scheme.

Here, the non-contact scheme may refer to a scheme in which power is transmitted without a direct connection between conductors of a transmitting side and a receiving side in a process in which power is transmitted from the transmitting side to the receiving side, that is, a contactless scheme, a wireless transmitting scheme, or the like.

The non-contact type power receiving apparatus B according to the exemplary embodiment of the present disclosure may be a wearable device, more particularly, a smart watch, by way of example.

Dissimilar to a mobile communications terminal, such a non-contact type power receiving apparatus may have various forms, and positioning thereof on the power charging pad may be difficult. Therefore, the non-contact type power receiving apparatus may be provided on the power charging pad in a manner in which the non-contact type power receiving apparatus is able to receive power while being positioned on the power charging pad in various directions by including a plurality of power receiving coil units as illustrated in FIG. 1.

In general, in a case in which the plurality of power receiving coil units are included, since a rectifying circuit is connected to each of the plurality of power receiving coil units, a plurality of rectifying circuits may be required. However, in the non-contact type power receiving apparatus B according to the exemplary embodiment of the present disclosure, two power receiving coil units may share a single rectifying circuit.

A description thereof will be provided hereinbelow.

Figure 2:
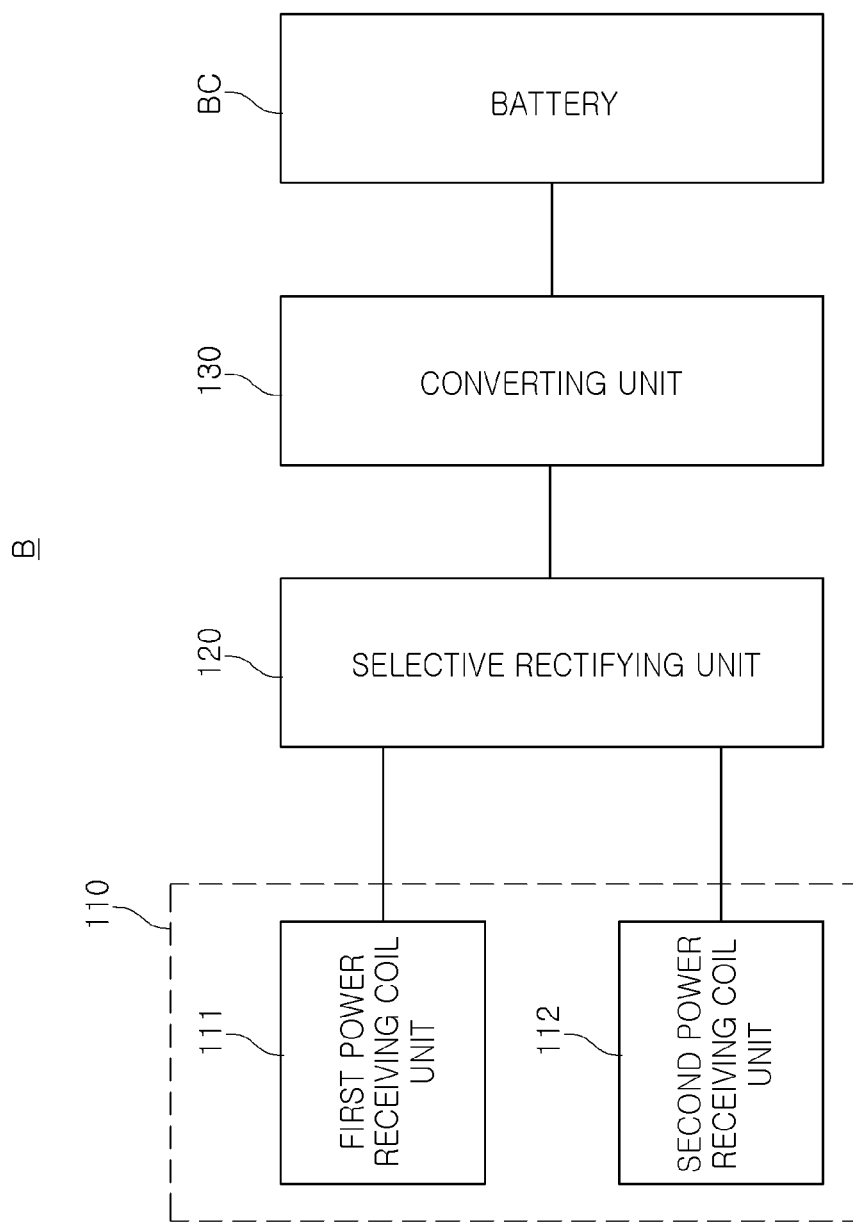
FIG. 2 is a schematic block diagram of a non-contact type power receiving apparatus according to an exemplary embodiment of the present disclosure.

FIG. 2 is a schematic block diagram of a non-contact type power receiving apparatus according to an exemplary embodiment of the present disclosure.

Referring to FIG. 2, the non-contact type power receiving apparatus B according to the exemplary embodiment of the present disclosure may include a coil unit 110, a selective rectifying unit 120, and a converting unit 130.

The coil unit 110 may include first and second power receiving coil units 111 and 112.

The first and second power receiving coil units 111 and 112 may receive power from an external power transmitting coil in a non-contact scheme. Since the first power receiving coil unit 111 and the second power receiving unit 112 are formed at positions different from one another, power may be transmitted to one of the first and second power receiving coil units 111 and 112.

The selective rectifying unit 120 may rectify power from the first power receiving coil unit 111 or the second power receiving coil unit 112 of the coil unit 110.

The converting unit 130 may convert the rectified power into charging power by switching the rectified power provided by the selective rectifying unit 120 through a switch Q, and may transfer the charging power to a battery BC.

In the battery BC, at least one battery cell may be included therein or a plurality of battery cells may be included therein.

Figure 3:
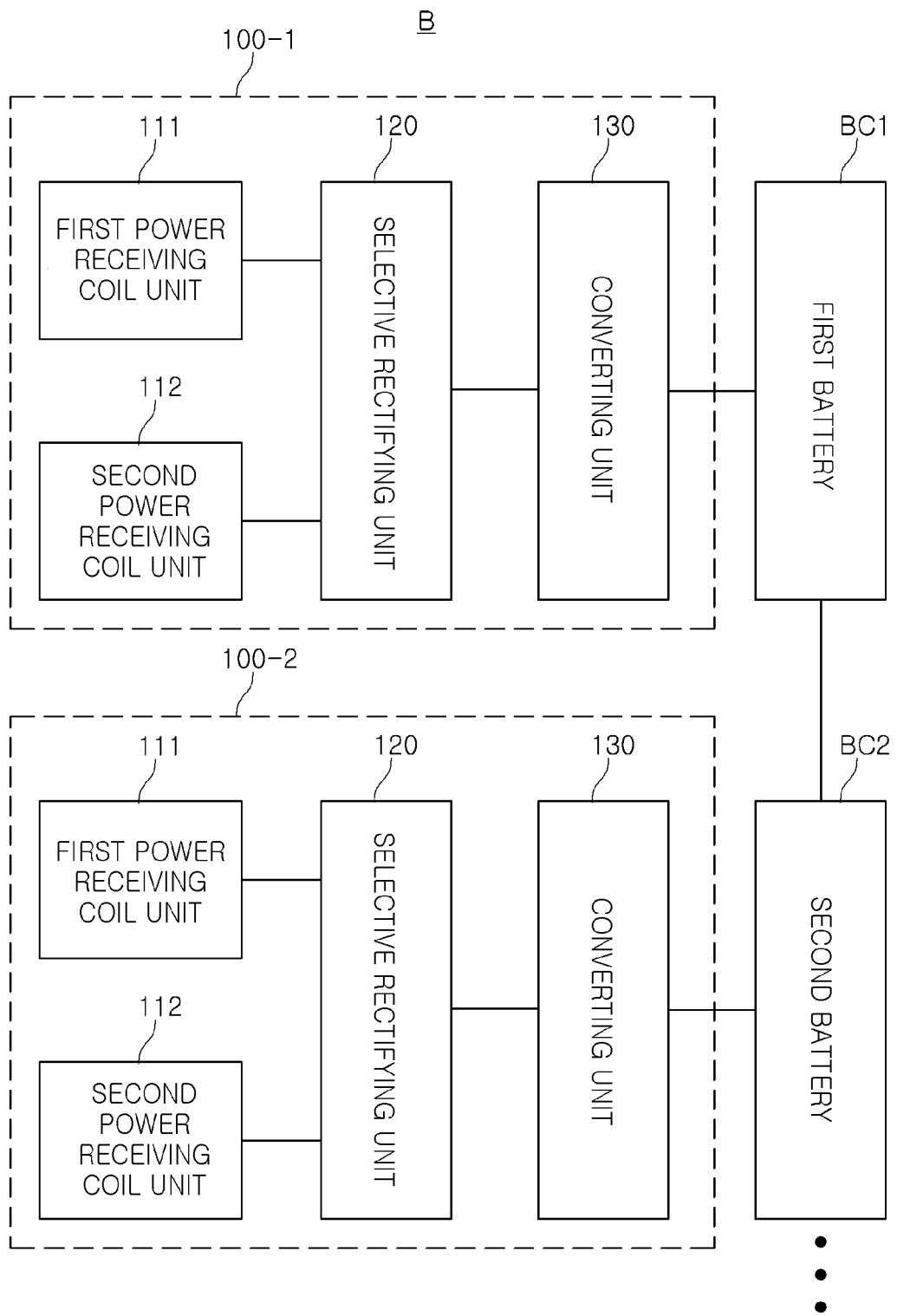
FIG. 3 is a schematic block diagram of a non-contact type power receiving apparatus according to another exemplary embodiment of the present disclosure.

FIG. 3 is a schematic block diagram of a non-contact type power receiving apparatus according to another exemplary embodiment of the present disclosure.

Referring to FIG. 3, in a case in which the plurality of battery cells are provided, the plurality of battery cells may be connected in series with one another. For example, in a case in which a first battery cell BC1 and a second battery cell BC2 connected in series with one another are provided, a non-contact type power receiving apparatus B according to another exemplary embodiment of the present disclosure may include a first power receiving unit 100-1 transmitting charging power to the first battery cell BC1 and a second power receiving unit 100-2 transmitting charging power to the second battery cell BC2.

The first power receiving unit 100-1 and the second power receiving unit 100-2 may each include the first and second power receiving coil units 111 and 112, the selective rectifying unit 120, and the converting unit 130 identical to those illustrated in FIG. 2.

Since functions and operations of the first and second power receiving coil units 111 and 112, the selective rectifying unit 120, and the converting unit 130 described above are the same as those described in FIG. 2, a detailed description thereof will be omitted.

Figure 4:
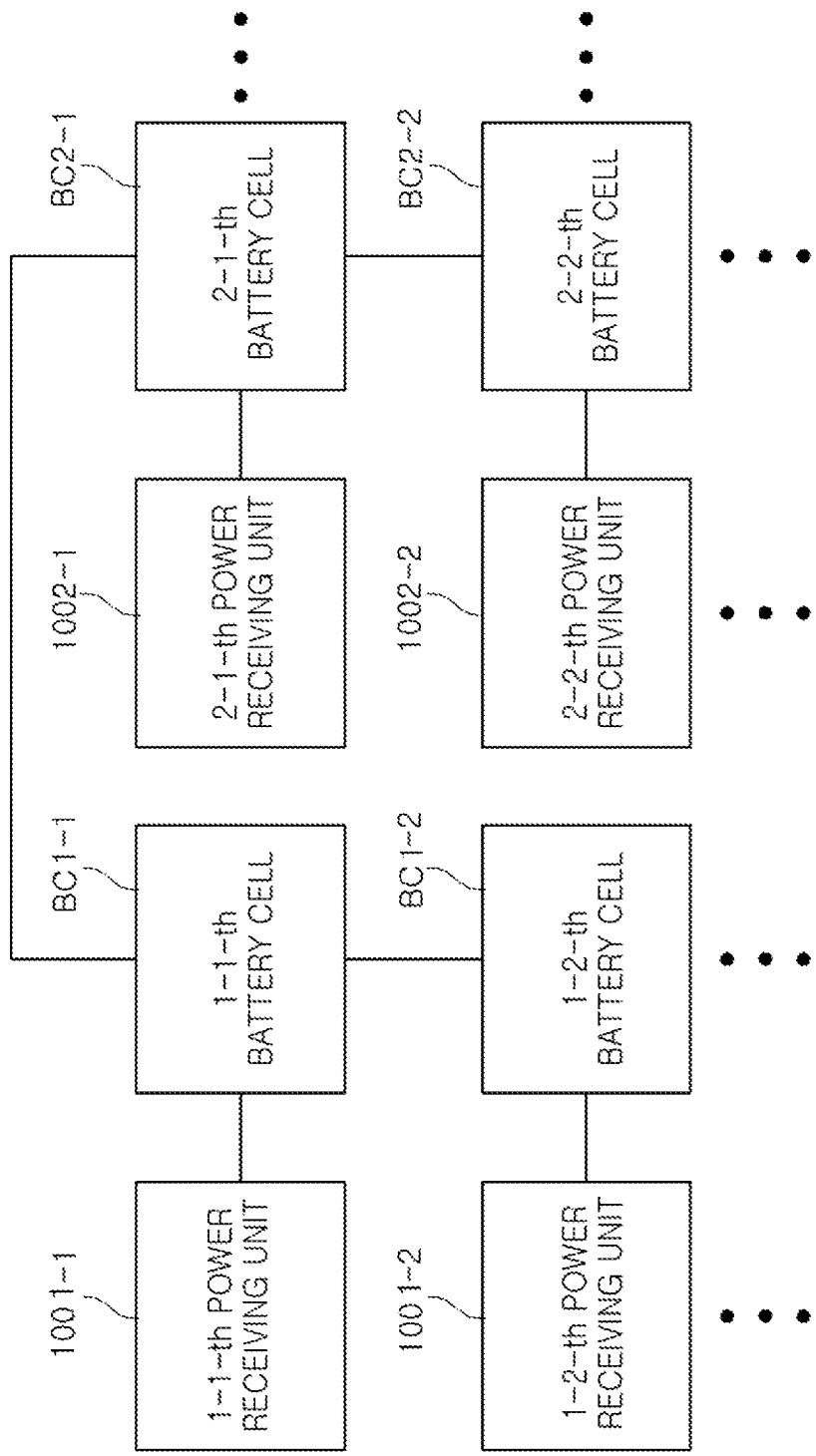
FIG. 4 is a schematic block diagram of a non-contact type power receiving apparatus according to another exemplary embodiment of the present disclosure.

FIG. 4 is a schematic block diagram of a non-contact type power receiving apparatus according to another exemplary embodiment of the present disclosure.

Referring to FIG. 4, in a case in which a plurality of battery cells are provided, the plurality of battery cells may be connected in series with and in parallel to one another. For example, 1-1-th and 1-2-th battery cells BC1-1 and BC1-2 may be connected in series with one another, 2-1-th and 2-2-th battery cells BC2-1 and BC2-2 may also be connected in series with one another, and the 1-1-th and 1-2-th battery cells BC1-1 and BC1-2 configuring one battery cell array and the 2-1-th and 2-2-th battery cells BC2-1 and BC2-2 configuring another battery cell array may be connected in parallel to one another.

The non-contact type power receiving apparatus B according to the other exemplary embodiment of the present disclosure may include a plurality of power receiving units to transmit charging power to the plurality of battery cells connected in series with or in parallel to one another. For example, a 1-1-th power receiving unit 1001-1 may transmit charging power to the 1-1-th battery cell BC1-1, and a 1-2-th power receiving unit 1001-2 may transmit charging power to the 1-2-th battery cell BC1-2. Similarly, a 2-1-th power receiving unit 1002-1 may transmit charging power to the 2-1-th battery cell BC2-1, and a 2-2-th power receiving unit 1002-2 may transmit charging power to the 2-2-th battery cell BC2-2.

The 1-1-th and 1-2-th power receiving units 1001-1 and 1001-2, and the 2-1-th and 2-2-th power receiving units 1002-1 and 1000-2 may each include the first and second power receiving coil units 111 and 112, the selective rectifying unit 120, and the converting unit 130 illustrated in FIG. 2 or 3. Since functions and operations of the first and second power receiving coil units 111 and 112, the selective rectifying unit 120, and the converting unit 130 are the same as those described in FIG. 2, a detailed description thereof will be omitted.

Figure 5:
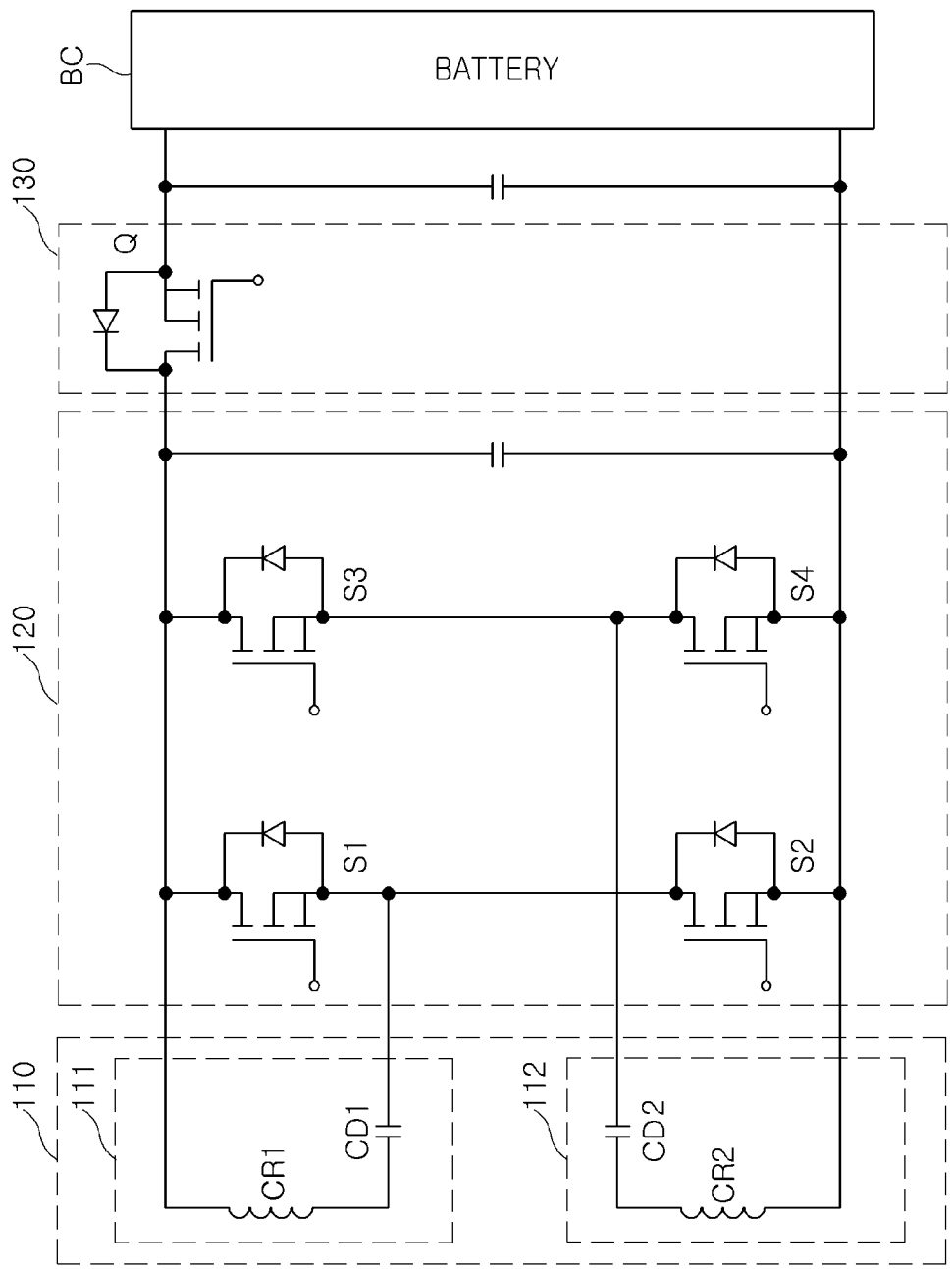
FIG. 5 is a schematic circuit diagram of a non-contact type power receiving apparatus according to an exemplary embodiment of the present disclosure.

FIG. 5 is a schematic circuit diagram of a non-contact type power receiving apparatus B according to an exemplary embodiment of the present disclosure.

Referring to FIG. 5, the coil unit 110 of the non-contact type power receiving apparatus B according to an exemplary embodiment of the present disclosure may include the first and second power receiving coil units 111 and 112, wherein the first power receiving coil unit 111 may include a first power receiving coil CR1 and a first capacitor CD1, and the second power receiving coil unit 112 may include a second power receiving coil CR2 and a second capacitor CD2.

One of the first and second power receiving coils CR1 and CR2 may receive power from a power transmitting coil of an external power charging pad in the non-contact scheme. The first and second capacitors CD1 and CD2 may be connected between the first power receiving coil CR1 and the selective rectifying unit 120 and between the second power receiving coil CR2 and the selective rectifying unit 120, respectively, to block direct current (DC) power and perform a voltage multiplying operation through rectification switching by the selective rectifying unit 120. A description thereof will be provided in greater detail with reference to FIGS. 6A and 6B or FIGS. 7A and 7B.

The selective rectifying unit 120 may rectify power transmitted to the first or second power receiving coil CR1 or CR2, and may include first to fourth switches S1, S2, S3, and S4.

The first switch and the second switch S1 and S2 may rectify power from the first power receiving coil CR1, and the third switch and the fourth switch S3 and S4 may rectify power from the second power receiving coil CR2. For a full-wave rectifying operation, when the first switch S1 is turned on, the fourth switch S4 may also be turned on, and when the second switch S2 is turned on, the third switch S3 may also be turned on. However, since corresponding magnetic fluxes are not interlinked, the switches may not be shown to be in operation even in a case in which the switches are actually operating.

More particularly, each of the first to fourth switches S1, S2, S3, and S4 may be provided as a transistor or a field effect transistor (FET).

The first switch S1 may have a source and a drain connected to one end of the first power receiving coil CR1, and the second switch S2 may have a drain connected to the source of the first switch S1 and connected to the other end of the first power receiving coil CR1, and a source connected to the other end of the second power receiving coil CR2.

The third switch S3 may have a source and a drain connected to one end of the first power receiving coil CR1 together with the drain of the first switch S1, and the fourth switch S4 may have a drain connected to the source of the third switch S3 and connected to one end of the second power receiving coil CR2, and a source connected to the other end of the second power receiving coil CR2 together with the source of the second switch S2.

In order for two power receiving coils to have a single full-wave rectifying circuit, one end of the first power receiving coil CR1 may be connected to one end, a positive (+) terminal, of the battery BC through the switch Q of the converting unit 130, and the other end of the second power receiving coil CR2 may be connected to the other end, a negative (−) terminal, of the battery BC.

In a case in which power is transmitted to the first power receiving coil CR1, the first switch S1 and the second switch S2 may perform switching in an alternating manner, and in a case in which power is transmitted to the second power receiving coil CR2, the third switch S3 and the fourth switch S4 may perform switching in an alternating manner.

Figure 6A:
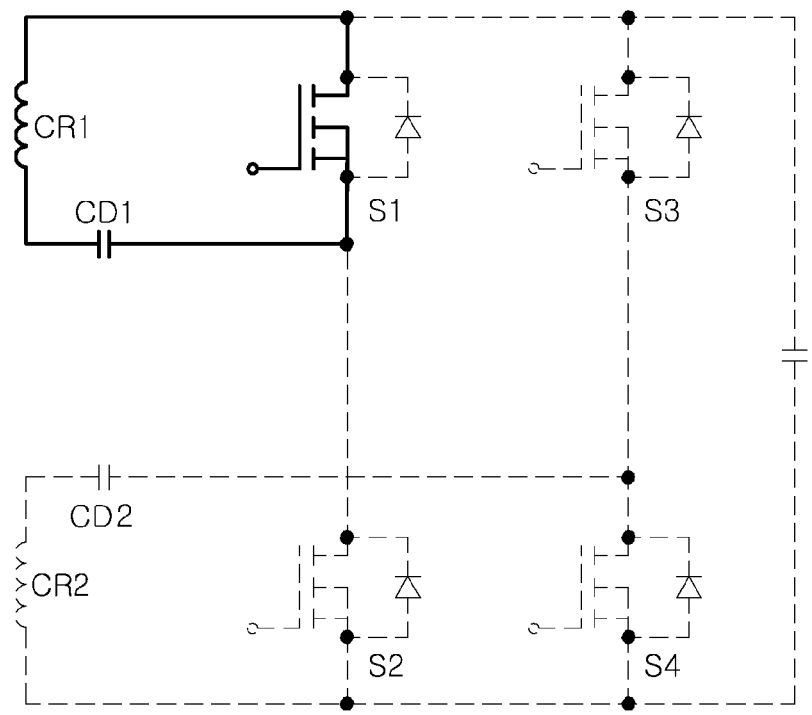
FIGS. 6A and 6B are circuit diagrams illustrating a first operation of a non-contact type power receiving apparatus according to an exemplary embodiment of the present disclosure.
Figure 6B:
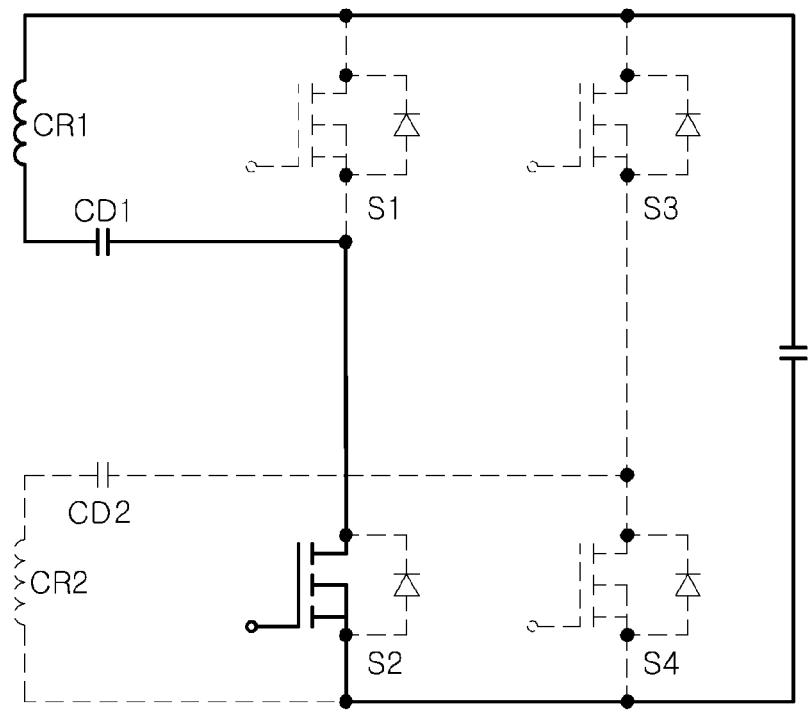

FIGS. 6A and 6B are circuit diagrams illustrating a first operation of a non-contact type power receiving apparatus according to an exemplary embodiment of the present disclosure.

The first capacitor CD1 may be connected between the other end of the first power receiving coil CR1 and the source of the first switch S1.

The first capacitor CD1 may be charged with power from the first power receiving coil CR1 at a time of conduction of the first switch S1 as illustrated in FIG. 6A, and may form a transfer path of transferring rectified power to the converting unit 130 at a time of conduction of the second switch S2 as illustrated in FIG. 6B, thereby multiplying a voltage level.

As described above, for the full-wave rectifying operation, when the first switch S1 is turned on, the fourth switch S4 may also be turned on, and when the second switch S2 is turned on, the third switch S3 may also be turned on. However, since the corresponding magnetic fluxes are not interlinked, the switches may seem as though they are not operating.

Figure 7A:
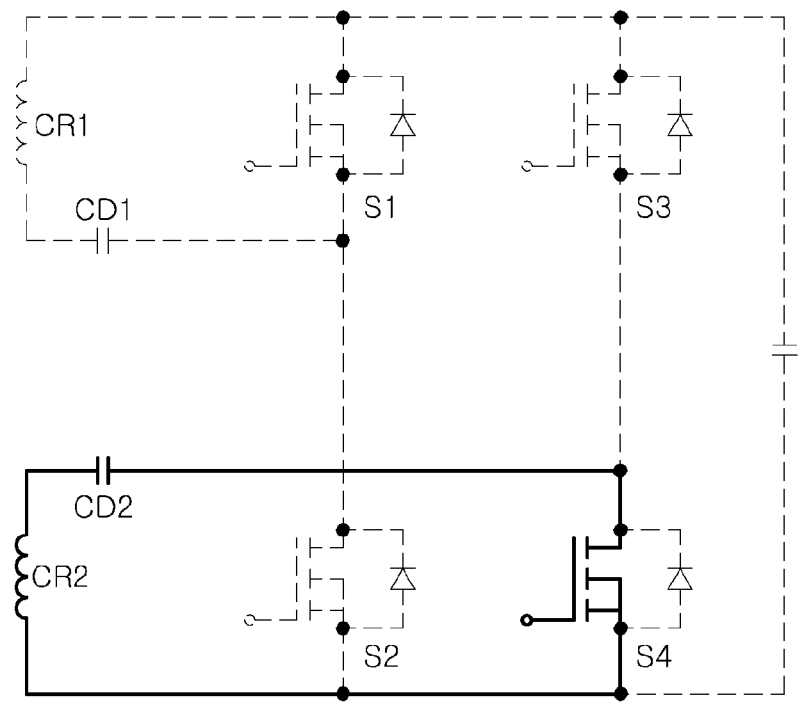
FIGS. 7A and 7B are circuit diagrams illustrating a second operation of a non-contact type power receiving apparatus according to an exemplary embodiment of the present disclosure.
Figure 7B:
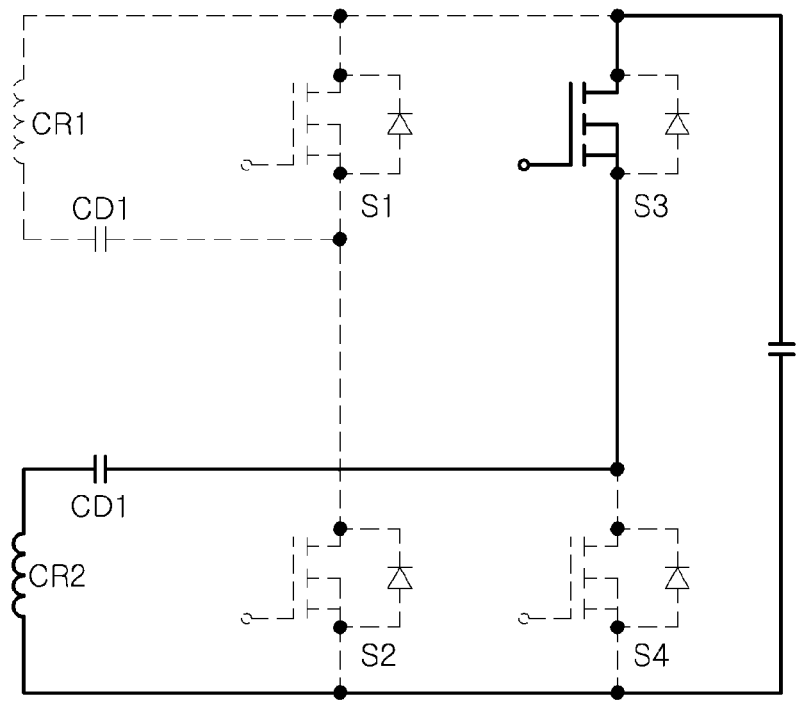

The above-mentioned description may also be applied to the following description of FIGS. 7A and 7B.

FIGS. 7A and 7B are circuit diagrams illustrating a second operation of a non-contact type power receiving apparatus according to an exemplary embodiment of the present disclosure.

The second capacitor CD2 may be connected between one end of the second power receiving coil CR2 and the source of the third switch S3.

The second capacitor CD2 may be charged with power from the second power receiving coil CR2 at a time of conduction of the fourth switch S4 as illustrated in FIG. 7A, and may form a transfer path of transferring rectified power to the converting unit 130 at a time of conduction of the third switch S3 as illustrated in FIG. 7B, thereby multiplying a voltage level.

As set forth above, according to exemplary embodiments of the present disclosure, the two power receiving coils may share a single rectifying circuit, whereby costs required for manufacturing the non-contact type power receiving apparatus and a volume thereof may be reduced.

While exemplary embodiments have been shown and described above, it will be apparent to those skilled in the art that modifications and variations could be made without departing from the scope of the present invention as defined by the appended claims.

What is claimed is:

1. A non-contact type power receiving apparatus, comprising:
   a first power receiving coil and a second power receiving coil; and
   a selective rectifying unit rectifying power from one of the first and second power receiving coils which receives the power from an external power transmitting coil in a non-contact scheme,
   wherein the selective rectifying unit includes a plurality of switches forming a first transfer path rectifying power received from the first power receiving coil, and a second transfer path rectifying power received from the second power receiving coil and differing from the first transfer path.

2. The non-contact type power receiving apparatus of claim 1, wherein the selective rectifying unit includes:
   a first switch and a second switch rectifying the power received from the first power receiving coil; and
   a third switch and a fourth switch rectifying the power received from the second power receiving coil.

3. The non-contact type power receiving apparatus of claim 2, further comprising:
   a first capacitor charged with the power received from the first power receiving coil at a time of conduction of the first switch and multiplying a voltage level thereof at a time of conduction of the second switch; and
   a second capacitor charged with the power received from the second power receiving coil at a time of conduction of the fourth switch and multiplying a voltage level thereof at a time of conduction of the third switch.

4. The non-contact type power receiving apparatus of claim 2, wherein the first switch has a source and a drain connected to one end of the first power receiving coil,
   the second switch has a drain connected to the source of the first switch and a source connected to the other end of the second power receiving coil, the third switch has a source and a drain connected to one end of the first power receiving coil together with the drain of the first switch, and the fourth switch has a drain connected to the source of the third switch and a source connected to the other end of the second power receiving coil together with the source of the second switch.

5. The non-contact type power receiving apparatus of claim 3, wherein the first capacitor is connected between the source of the first switch and the other end of the first power receiving coil, and the second capacitor is connected between the source of the third switch and one end of the second power receiving coil.

6. The non-contact type power receiving apparatus of claim 1, further comprising a converting unit converting the rectified power into charging power and transmitting the charging power to a battery.

7. A non-contact type power receiving apparatus, comprising:

a plurality of power receiving units receiving power in a non-contact scheme; and a plurality of battery cells receiving power from each of the plurality of power receiving units and being charged with the power, wherein each of the plurality of power receiving units includes:

a first power receiving coil and a second power receiving coil;

a selective rectifying unit rectifying power from one of the first and second power receiving coils which receives the power from an external power transmitting coil in the non-contact scheme; and a converting unit converting the rectified power into charging power and transmitting the charging power to a corresponding battery cell, and wherein the plurality of battery cells are electrically connected to one another in at least one of a serial connection scheme and a parallel connection scheme.

8. The non-contact type power receiving apparatus of claim 7, wherein the selective rectifying unit includes:

a first switch and a second switch rectifying the power received from the first power receiving coil; and a third switch and a fourth switch rectifying the power received from the second power receiving coil.

9. The non-contact type power receiving apparatus of claim 8, further comprising:

a first capacitor charged with the power received from the first power receiving coil at a time of conduction of the first switch and multiplying a voltage level thereof at a time of conduction of the second switch; and a second capacitor charged with the power received from the second power receiving coil at a time of conduction of the fourth switch and multiplying a voltage level thereof at a time of conduction of the third switch.

10. The non-contact type power receiving apparatus of claim 8, wherein the first switch has a source and a drain connected to one end of the first power receiving coil, the second switch has a drain connected to the source of the first switch and a source connected to the other end of the second power receiving coil, the third switch has a source and a drain connected to one end of the first power receiving coil together with the drain of the first switch, and the fourth switch has a drain connected to the source of the third switch and a source connected to the other end of the second power receiving coil together with the source of the second switch.

11. The non-contact type power receiving apparatus of claim 9, wherein the first capacitor is connected between the source of the first switch and the other end of the first power receiving coil, and the second capacitor is connected between the source of the third switch and one end of the second power receiving coil.

* * * * *